US011230385B2

(12) United States Patent
Adibhatla et al.

(10) Patent No.: US 11,230,385 B2
(45) Date of Patent: Jan. 25, 2022

(54) HYBRID-ELECTRIC PROPULSION SYSTEM FOR AN AIRCRAFT

(71) Applicant: General Electric Company, Schenectady, NY (US)

(72) Inventors: Sridhar Adibhatla, Glendale, OH (US); Robert Charles Hon, Fort Mitchell, KY (US); Michael Thomas Gansler, Mason, OH (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 15/617,080

(22) Filed: Jun. 8, 2017

(65) Prior Publication Data

US 2018/0354631 A1    Dec. 13, 2018

(51) Int. Cl.

| F02C 7/36 | (2006.01) |
|---|---|
| F02C 3/113 | (2006.01) |
| B64D 31/06 | (2006.01) |
| B64D 27/24 | (2006.01) |
| B64D 27/10 | (2006.01) |
| B64D 35/08 | (2006.01) |
| F02C 9/42 | (2006.01) |

(Continued)

(52) U.S. Cl.
CPC ............ *B64D 27/24* (2013.01); *B64D 27/10* (2013.01); *B64D 31/06* (2013.01); *B64D 35/08* (2013.01); *B64D 27/02* (2013.01); *B64D 31/02* (2013.01); *F05D 2270/304* (2013.01)

(58) Field of Classification Search
None
See application file for complete search history.

(56) References Cited

U.S. PATENT DOCUMENTS 4,651,563 A * 3/1987 Zweifel ................. F02C 9/00
                                                      701/100
4,900,231 A   2/1990 Kennedy
(Continued)

FOREIGN PATENT DOCUMENTS

EP    2472084 A2    7/2012
EP    2985901 A1    2/2016
(Continued)

OTHER PUBLICATIONS

European Search Report Corresponding to EP Application 181764812 dated Sep. 14, 2018.
(Continued)

*Primary Examiner* — Gerald L Sung
*Assistant Examiner* — Rodolphe Andre Chabreyrie
(74) *Attorney, Agent, or Firm* — Dority & Manning, P.A.

(57) ABSTRACT

A hybrid-electric propulsion system for an aircraft includes a turbomachine, the turbomachine including a first spool and a second spool. A method for operating the hybrid electric propulsion system includes operating, by one or more computing devices, the turbomachine such that the first spool mechanically drives a prime propulsor of the hybrid-electric propulsion system; and modifying, by the one or more computing devices, a speed relationship parameter defined between the first spool and second spool by providing electrical power to, or drawing electrical power from, an electric machine mechanically coupled to the first spool, the second spool, or both.

19 Claims, 8 Drawing Sheets

(51) Int. Cl.
*B64D 27/02* (2006.01)
*B64D 31/02* (2006.01)

(56) References Cited

U.S. PATENT DOCUMENTS

| | | | | |
|---|---|---|---|---|
| 5,622,045 | A * | 4/1997 | Weimer | F02C 9/16 60/204 |
| 6,082,967 | A * | 7/2000 | Loisy | F02C 7/36 415/68 |
| 7,552,582 | B2 * | 6/2009 | Eick | F02C 3/107 60/39.163 |
| 7,621,117 | B2 | 11/2009 | Dooley et al. | |
| 8,459,038 | B1 | 6/2013 | Lickfold et al. | |
| 8,461,704 | B2 | 6/2013 | McLoughlin et al. | |
| 9,021,780 | B2 | 5/2015 | Bowman et al. | |
| 9,200,592 | B2 | 12/2015 | Berryann et al. | |
| 9,548,639 | B2 | 1/2017 | Goi et al. | |
| 10,393,027 | B2 * | 8/2019 | Lefebvre | F02C 3/10 |
| 10,808,624 | B2 * | 10/2020 | Dubreuil | F02C 3/107 |
| 2007/0057113 | A1 * | 3/2007 | Parks | B64C 15/00 244/12.5 |
| 2008/0149445 | A1 * | 6/2008 | Kern | F01D 15/10 192/3.56 |
| 2010/0058731 | A1 * | 3/2010 | Haehner | F02C 3/10 60/39.15 |
| 2012/0000204 | A1 * | 1/2012 | Kesseli | F02C 3/107 60/778 |
| 2012/0167576 | A1 | 7/2012 | Taneja | |
| 2015/0100180 | A1 | 4/2015 | Oyori et al. | |
| 2016/0023773 | A1 | 1/2016 | Himmelmann et al. | |
| 2016/0214727 | A1 | 7/2016 | Hamel et al. | |
| 2016/0251977 | A1 * | 9/2016 | Gates | F01D 5/06 416/169 R |
| 2016/0304211 | A1 | 10/2016 | Swann | |
| 2016/0325629 | A1 | 11/2016 | Siegel et al. | |
| 2017/0044989 | A1 | 2/2017 | Gemin et al. | |
| 2017/0226934 | A1 | 8/2017 | Robic et al. | |
| 2017/0260872 | A1 * | 9/2017 | Munevar | F01D 21/006 |
| 2017/0298816 | A1 * | 10/2017 | Razak | F16H 41/24 |
| 2018/0073438 | A1 * | 3/2018 | Durocher | F02C 6/206 |
| 2018/0149091 | A1 * | 5/2018 | Howell | F02C 7/32 |
| 2018/0354631 | A1 | 12/2018 | Adibhatla et al. | |

FOREIGN PATENT DOCUMENTS

| | | |
|---|---|---|
| EP | 3048042 A1 | 7/2016 |
| JP | 2017/048784 A | 3/2017 |
| WO | WO2016/020618 A1 | 2/2016 |

OTHER PUBLICATIONS

Machine Translated Japanese Search Report Corresponding to Application No. 2018108195 dated Aug. 21, 2019.
Machine Translated Japanese Office Action Corresponding to Application No. 2018108195 dated May 28, 2020.

* cited by examiner

HYBRID-ELECTRIC PROPULSION SYSTEM FOR AN AIRCRAFT

FIELD

The present subject matter relates generally to a hybrid-electric propulsion system for an aircraft and a method for operating the same.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

With dual-spool turbofan jet engines, a low pressure spool connects a low pressure compressor to a low pressure turbine, and a high pressure spool connects a high pressure compressor to a high pressure turbine. The low pressure spool may further be connected to a fan. During turn-down operations (e.g., engine deceleration or other thrust reduction operations), the high pressure components may slow down more quickly than the low pressure components due to, e.g., a greater inertia of the low pressure components and/or features attached to the low pressure components, such as the fan. Accordingly, in order to prevent the low pressure compressor from stalling when the high pressure components slow down more quickly, bleed valve doors are typically provided to allow for air to be bled downstream of the low pressure compressor.

However, these bleed valve doors, and other associated equipment, may be relatively heavy, especially given the infrequency of their use. Accordingly, a propulsion system having a gas turbine engine capable of reducing a size or eliminating the bleed valve doors would be useful.

BRIEF DESCRIPTION

Aspects and advantages of the invention will be set forth in part in the following description, or may be obvious from the description, or may be learned through practice of the invention.

In one exemplary aspect of the present disclosure, a method is provided of operating a hybrid-electric propulsion system for an aircraft having a turbomachine, the turbomachine including a first spool and a second spool. The method includes operating, by one or more computing devices, the turbomachine such that the first spool mechanically drives a prime propulsor of the hybrid-electric propulsion system; and modifying, by the one or more computing devices, a speed relationship parameter defined between the first spool and second spool by providing electrical power to, or drawing electrical power from, an electric machine mechanically coupled to the first spool, the second spool, or both.

In certain exemplary aspects modifying, by the one or more computing devices, the speed relationship parameter defined between the first spool and second spool includes: receiving, by the one or more computing devices, data indicative of a rotational speed of the first spool; receiving, by the one or more computing devices, data indicative of a rotational speed of the second spool; determining, by the one or more computing devices, the speed relationship parameter is outside a desired speed relationship parameter range; and providing, by the one or more computing devices, electrical power to, or drawing, by the one or more computing devices, electrical power from, the electric machine to bring the speed relationship parameter within the desired speed relationship parameter range.

In certain exemplary aspects, the method further includes modifying, by the one or more computing devices, a fuel flow to a combustion section of the turbomachine. With such an exemplary aspect modifying, by the one or more computing devices, the speed relationship parameter defined between the first spool and second spool includes providing, by the one or more computing devices, electrical power to, or drawing, by the one or more computing devices, electrical power from, the electric machine to bring or maintain the speed relationship parameter within a desired speed relationship parameter range.

For example, in certain exemplary aspects modifying, by the one or more computing devices, the fuel flow to the combustion section of the turbomachine includes reducing, by the one or more computing devices, the fuel flow to the combustion section of the turbomachine such that a speed of the second spool is urged to reduce relative to a speed of the first spool.

For example, in certain exemplary aspects the first spool is a low pressure spool, wherein the second spool is a high pressure spool, wherein the electric machine is mechanically coupled to the first spool, and wherein modifying, by the one or more computing devices, the speed relationship parameter defined between the first spool and second spool includes drawing, by the one or more computing devices, electrical power from the electric machine to bring or maintain the speed relationship parameter within the desired speed relationship parameter range.

For example, in certain exemplary aspects reducing, by the one or more computing devices, the fuel flow to the combustion section of the gas turbine engine includes initiating, by the one or more computing devices, a flight phase of the aircraft involving a reduction in power demand from the gas turbine engine.

For example, in certain exemplary aspects modifying, by the one or more computing devices, the fuel flow to the combustion section of the turbomachine includes increasing, by the one or more computing devices, the fuel flow to the combustion section of the turbomachine such that a speed of the second spool is urged to increase relative to a speed of the first spool.

For example, in certain exemplary aspects the first spool is a low pressure spool, wherein the second spool is a high pressure spool, wherein the electric machine is mechanically coupled to the second spool, and wherein modifying, by the one or more computing devices, the speed relationship parameter defined between the first spool and second spool includes providing, by the one or more computing devices, electrical power to the electric machine to bring or maintain the speed relationship parameter within the desired speed relationship parameter range.

For example, in certain exemplary aspects the first spool is a low pressure spool, wherein the second spool is a high pressure spool, wherein the first spool extends between a low pressure compressor and a low pressure turbine, wherein the second spool extends between a high pressure compressor and a high pressure turbine, and wherein modifying, by the one or more computing devices, the speed relationship parameter defined between the first spool and second spool includes wherein modifying, by the one or more computing devices, the speed relationship parameter while providing substantially all of an airflow from the low pressure compressor to the high pressure compressor.

In certain exemplary aspects the speed relationship parameter is an acceleration mismatch between the first spool and the second spool.

In certain exemplary aspects the hybrid electric propulsion system further includes an electric energy storage unit, wherein the electric energy storage unit is electrically connectable to the electric machine, and wherein modifying, by the one or more computing devices, the speed relationship parameter between the first spool and second spool includes modifying, by the one or more computing devices, the speed relationship parameter by providing electrical power to the electric machine from the electric energy storage unit, or drawing electrical power from the electric machine to the electric energy storage unit. For example, in certain exemplary aspects the electric energy storage unit is configured to store at least about fifty kilowatt hours of electrical power.

In certain exemplary aspects the prime propulsor is a fan, and wherein the fan and turbomachine are together configured as a turbofan engine.

In an exemplary embodiment of the present disclosure, a hybrid-electric propulsion system for an aircraft is provided. The hybrid electric propulsion system includes a turbomachine including a first spool, a second spool, and a combustion section. The hybrid electric propulsion system also includes a prime propulsor mechanically coupled to the first spool such that the first spool rotates the prime propulsor during operation. The hybrid electric propulsion system also includes an electric machine mechanically coupled to the first spool, the second spool, or both, and an electrical electric energy storage unit electrically connectable to the electric machine. The hybrid electric propulsion system also includes a controller including memory and one or more processors, the memory storing instructions that when executed by the one or more processors cause the hybrid-electric propulsion system to perform functions. The functions include modifying a speed relationship parameter between the first spool and second spool by providing electrical power to, or drawing electrical power from, the electric machine.

In certain exemplary embodiments the turbomachine includes a low pressure compressor coupled to the first spool, a high pressure compressor coupled to the second spool, and a duct extending from the low pressure compressor to the high pressure compressor, wherein the duct is fixed in position during all operating conditions of the turbomachine.

In certain exemplary embodiments the turbomachine includes a low pressure compressor coupled to the first spool, a high pressure compressor coupled to the second spool, and a duct extending from the low pressure compressor to the high pressure compressor, wherein the duct does not define any bleed valve openings.

In certain exemplary embodiments the instructions further include modifying a fuel flow to a combustion section of the turbomachine. With such an exemplary embodiment, modifying the speed relationship parameter defined between the first spool and second spool includes providing electrical power to, or drawing electrical power from, the electric machine to bring or maintain the speed relationship parameter within a desired speed relationship parameter range.

In certain exemplary embodiments modifying the speed relationship parameter defined between the first spool and second spool includes: receiving data indicative of a rotational speed of the first spool; receiving data indicative of a rotational speed of the second spool; determining the speed relationship parameter is outside a desired speed relationship parameter range; and providing electrical power to, or drawing electrical power from, the electric machine to bring the speed relationship parameter within the desired speed relationship parameter range.

In certain exemplary embodiments the first spool is a low pressure spool, wherein the second spool is a high pressure spool, wherein the first spool extends between a low pressure compressor and a low pressure turbine, wherein the second spool extends between a high pressure compressor and a high pressure turbine, and wherein modifying the speed relationship parameter includes modifying the speed relationship parameter while providing substantially all of an airflow from the low pressure compressor to the high pressure compressor.

In certain exemplary embodiments the electric energy storage unit is configured to store at least about fifty kilowatt hours of electrical power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
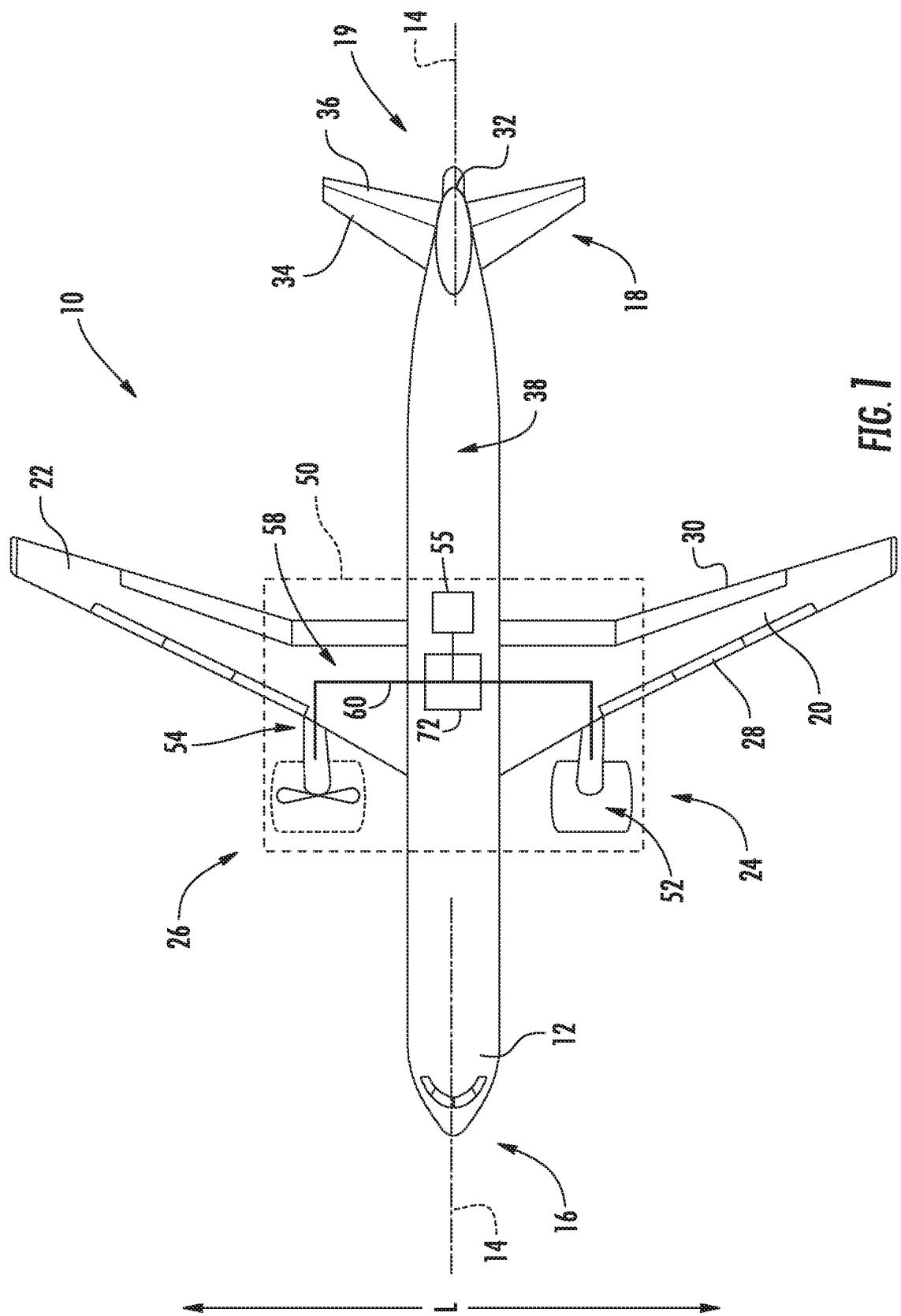
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally provides for a hybrid-electric propulsion system having a turbomachine coupled to a prime propulsor (e.g., a fan), an electric machine, an electric propulsor assembly (optionally), and an electric energy storage unit. The turbomachine includes at least two spools, such as a first, low pressure spool and a second, high pressure spool. The electric machine is coupled to the turbomachine, such that it is rotatable with one or both of the spools of the turbomachine. Additionally, the electric energy storage unit is electrically connectable to the electric machine and the electric propulsor assembly, if included. In such a manner, the electric energy storage unit may receive and store electrical power from the electric machine, and may further provide stored electrical power to one or both of the electric machine (to drive the electric machine), or to the electric propulsor assembly (to drive the electric propulsor assembly).

Moreover, the present disclosure provides for a method of operating the hybrid electric propulsion system to bring or maintain a speed relationship parameter defined between the first spool and second spool of the turbomachine within a desired speed relationship parameter range. For example, the exemplary method may operate the turbomachine such that the first spool mechanically drives the prime propulsor. Additionally, the method may modify the speed relationship parameter defined between the first spool and second spool by providing electrical power to, or drawing electrical power from, the electric machine mechanically coupled to the first spool, the second spool, or both. Further, in certain exemplary aspects, such may occur during steady-state operations (e.g., cruise) or during transient operations (e.g., transition from cruise to descent).

For example, during transient operations, such as when the aircraft transitions from cruise to descent and reduces a fuel flow to the turbomachine, the first spool may have more inertia, such that it tends to slow down at a slower rate than the second spool. Accordingly, for example, when the electric machine is coupled to the first spool, the method may extract power from the electric machine, effectively creating a drag on the first spool to slow down the first spool more quickly. By contrast, when the electric machine is coupled to the second spool, the method may provide power to the electric machine, effectively adding power to the second spool such that it slows down more slowly. Such may allow for the speed relationship parameter to be maintained within, or brought within, a desired speed relationship parameter range during such transient operations. Further, as will be discussed, such a configuration may allow for the elimination of variable bleed valve door assemblies within the turbomachine.

Similarly, during steady-state operations, it may be desirable for a speed of the first spool to be maintained at a higher or lower speed relative to the second spool than would naturally occur. Accordingly, for example, the method may extract power from the electric machine, effectively creating a drag on the spool to which it is attached to slow down such spool relative to the other spool. Additionally, or alternatively, the method may provide power to the electric machine, effectively adding power to the spool to which it is attached to speed up such spool relative to the other spool. Such may also allow for the speed relationship parameter to be maintained within, or brought within, a desired speed relationship parameter range during such steady-state operations.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
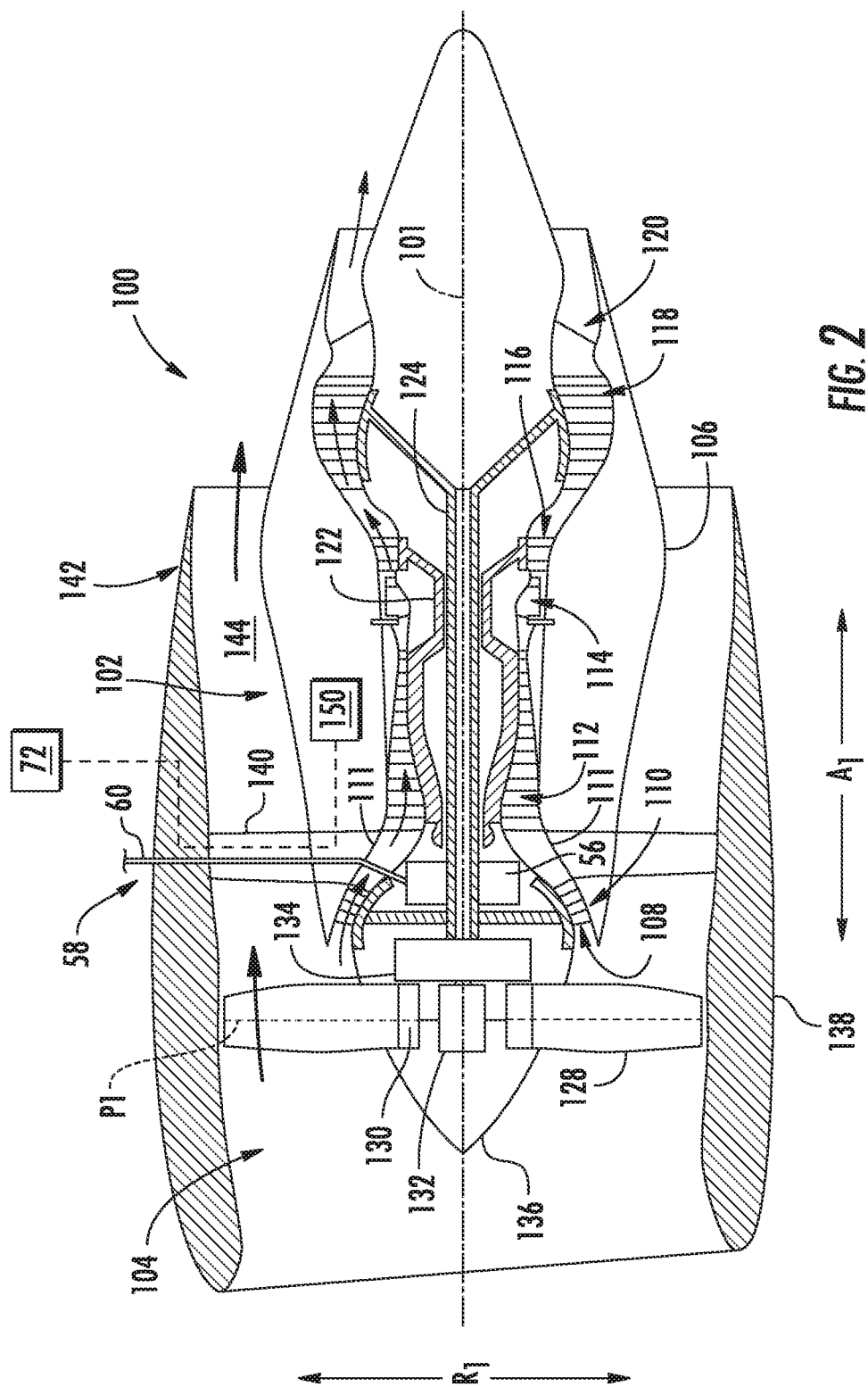
FIG. 2 is a schematic, cross-sectional view of a gas turbine engine mounted to the exemplary aircraft of FIG. 1.
Figure 3:
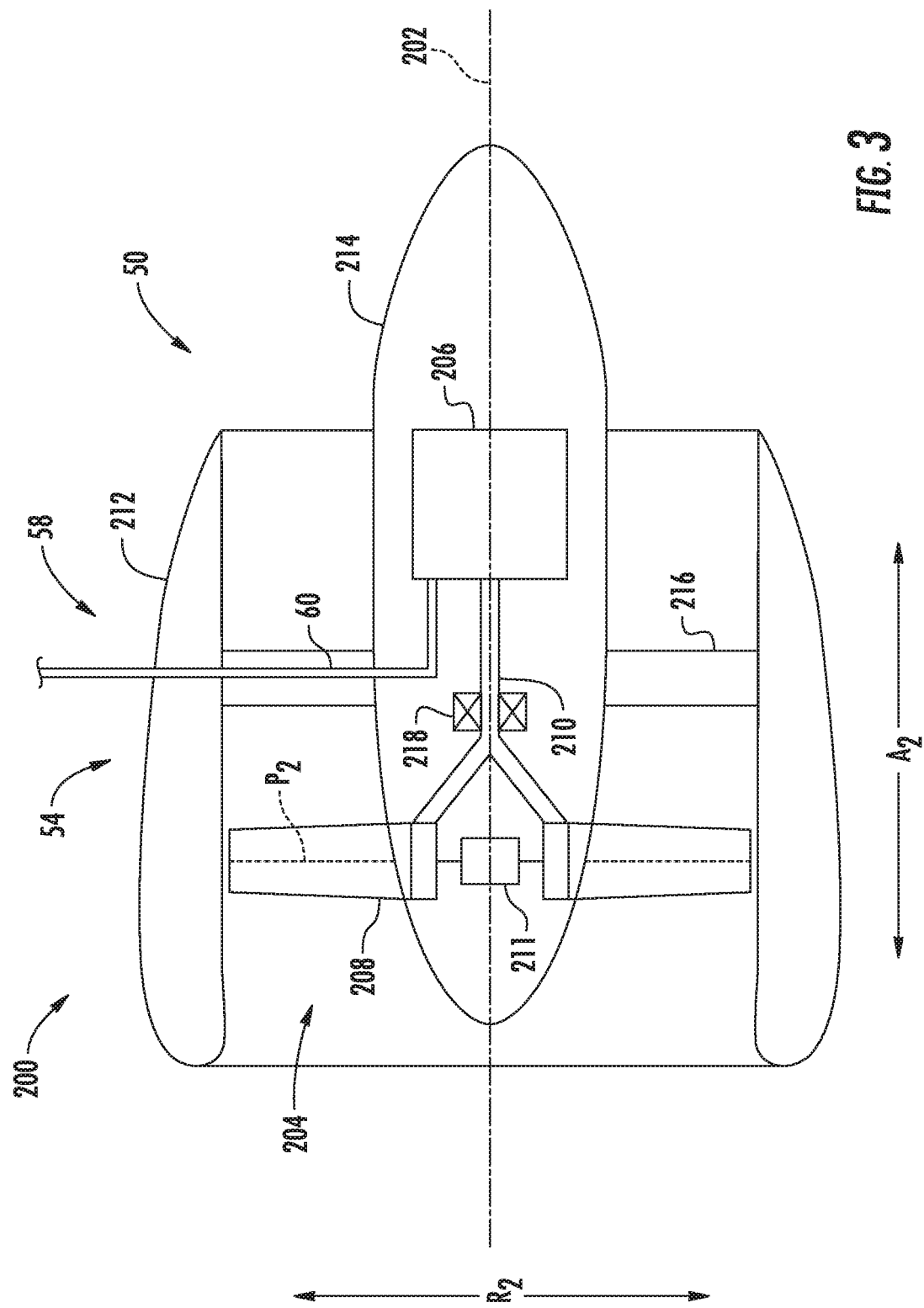
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

Referring generally to FIGS. 1 through 3, the exemplary hybrid-electric propulsion system 50 generally includes the first propulsor assembly 52 having a turbomachine and a prime propulsor (which, for the embodiment of FIG. 2 are configured together as a turbofan engine 100), an electric machine (which for the embodiment of FIG. 2 is configured as an electric motor/generator 56) drivingly coupled to the turbomachine, the second propulsor assembly 54 (which for the embodiment of FIG. 3 is configured as an electric propulsor 200 assembly electrically connectable to the electric machine), an electric energy storage unit 55, a controller 72, and a power bus 58. The electric propulsor assembly 200, the electric energy storage unit 55, and the electric machine are each electrically connectable through one or more electric lines 60 of the power bus 58. For example, the power bus 58 may include various switches or other power electronics movable to selectively electrically connect the various components of the hybrid electric propulsion system 50.

As will be described in greater detail below, the controller 72 is generally configured to distribute electrical power between the various components of the hybrid-electric propulsion system 50 to perform certain operations. For example, the controller 72 may be operable with the power bus 58 (including the one or more switches or other power electronics) to provide electrical power to, or draw electrical power from, the various components to operate the hybrid electric propulsion system 50 to bring or maintain a speed relationship parameter defined between an LP system and an HP system of turbomachine within a desired speed relationship parameter range.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc.

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical energy. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about five hundred kilowatt hours of electrical power.

Referring now particularly to FIGS. 1 and 2, the first propulsor assembly 52 includes a turbomachine 102, with the first propulsor assembly 52 mounted, or configured to be mounted, to the first wing 20 of the aircraft 10. More specifically, as is depicted, for the embodiment of FIG. 2, the first propulsor assembly 52 additionally includes a prime propulsor, or primary fan (referred to simply as "fan 104" with reference to FIG. 2). More specifically, for the embodiment depicted the turbomachine 102 and the fan 104 are configured together as part of a turbofan engine 100.

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted"

turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine, which for the embodiment depicted is configured as an electric motor/generator 56. The electric motor/generator 56 is, for the embodiment depicted, positioned within the turbomachine 102 of the turbofan engine 100 and is in mechanical communication with one of the shafts of the turbofan engine 100. More specifically, for the embodiment depicted, the electric motor/generator 56 is driven by the second, LP turbine 118 through the LP shaft 124 in certain operations, and may drive the LP shaft 124 in other operations. The electric motor/generator 56 may be configured to convert mechanical power of the LP shaft 124 to electric power in certain operations and may be configured to convert electrical power to mechanical power to be added to the LP shaft 124 in other operations.

It should be appreciated, however, that in other exemplary embodiments, the electric motor/generator 56 may instead be positioned at any other suitable location within the turbomachine 102 or elsewhere, and may be, e.g., powered in any other suitable manner. For example, the electric motor/generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric motor/generator 56 may instead be powered by the HP system, i.e., by the HP turbine 116 through the HP shaft 122 (see FIG. 7 below), or by both the LP system (e.g., the LP shaft 124) and the HP system (e.g., the HP shaft 122) via a dual drive system. Additionally, or alternatively, still, in other embodiments, the electric motor/generator 56 may include a plurality of electric motor/generators 56, e.g., with one being drivingly connected to the LP system (e.g., the LP shaft 124) and one being drivingly connected to the HP system (e.g., the HP shaft 122). Further, although described as a motor/generator, in certain embodiments, the electric motor/generator 56 may instead be configured solely as a motor, or solely as a generator.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, the LP shaft 124 may be directly mechanically coupled to the fan 104 (i.e., the turbofan engine 100 may not include the gearbox 134), and further, in other exemplary embodiments the turbofan engine 100 may further include any suitable number of spools and associated compressors and turbines (e.g., three or more). Further, it should be appreciated that in other exemplary embodiments, the first propulsor assembly 52 may include any other suitable type of engine. For example, in other embodiments, the turbofan engine 100 may instead be configured as a turboprop engine, an unducted turbofan engine, or any other suitable turbine-based engine.

Referring still to FIGS. 1 and 2, the turbofan engine 100 further includes a controller 150, and although not depicted, one or more sensors. The controller 150 may be a full authority digital engine control system, also referred to as a FADEC. The controller 150 of the turbofan engine 100 may be configured to control operation of, e.g., the actuation member 132, a fuel delivery system to the combustion section 114 (not shown), etc. Additionally, the controller 150 may be operably connected to the one or more sensors to receive data from the sensors and determine various operational parameters of the turbofan engine 100. For example, the controller 150 may determine one or more of a rotational speed of the LP system (e.g., of the LP shaft 124), a rotational speed of the HP system (e.g., of the HP shaft 122), etc. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric motor/generator 56, the second propulsor assembly 54, and the electric energy storage unit 55 through a suitable wired or wireless communication system (depicted in phantom).

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electric power source (e.g., the electric generator 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric motor/generator 56 and the electrical electric energy storage unit 55 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of combustion engines (such as turbomachines 102) and electric motor/generator 56. Further, in other exemplary embodiments, the electric propulsor assembly (ies) 200 and/or combustion engine(s) and electric motor/generator(s) 56 may be mounted to the aircraft 10 at any other suitable location in any other suitable manner (including, e.g., tail mounted configurations). Further, still, in other exemplary embodiments, the hybrid-electric propulsion system 50 may not include an electric propulsor assembly 200 at all.

Figure 4:
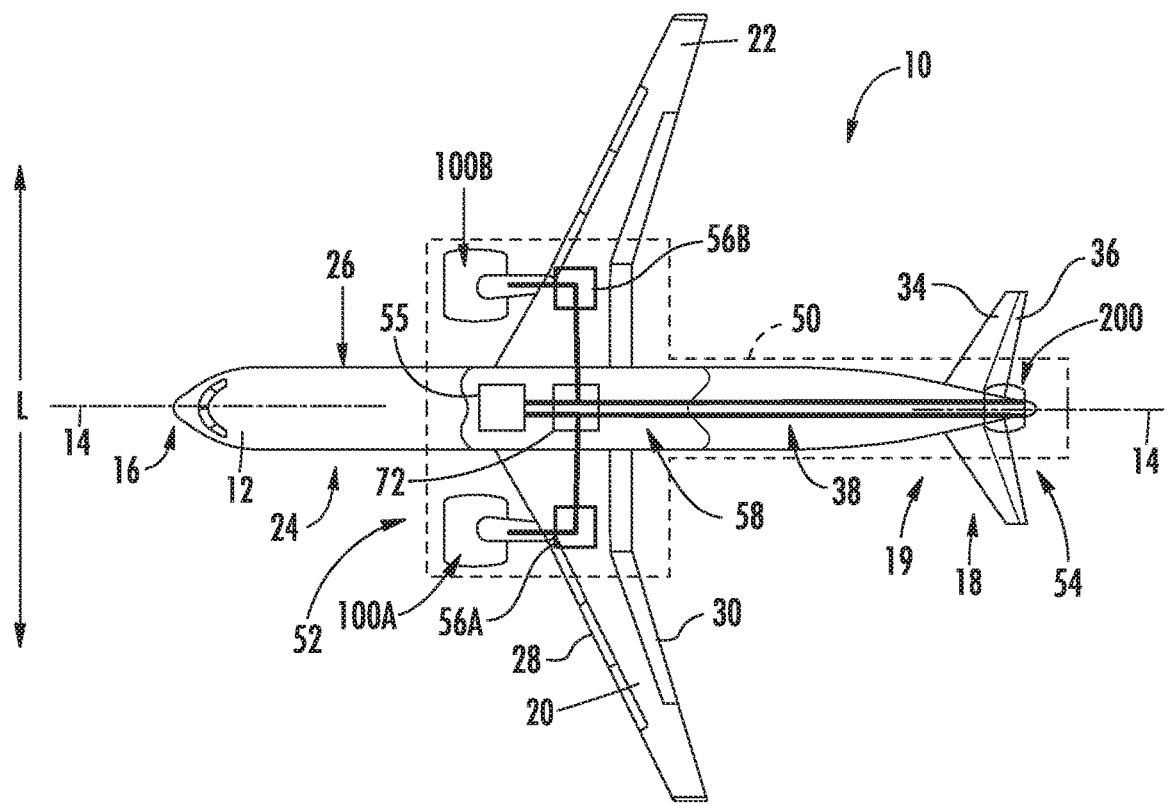
FIG. 4 is a top view of an aircraft including a hybrid-electric propulsion system in accordance with another exemplary embodiment of the present disclosure.
Figure 5:
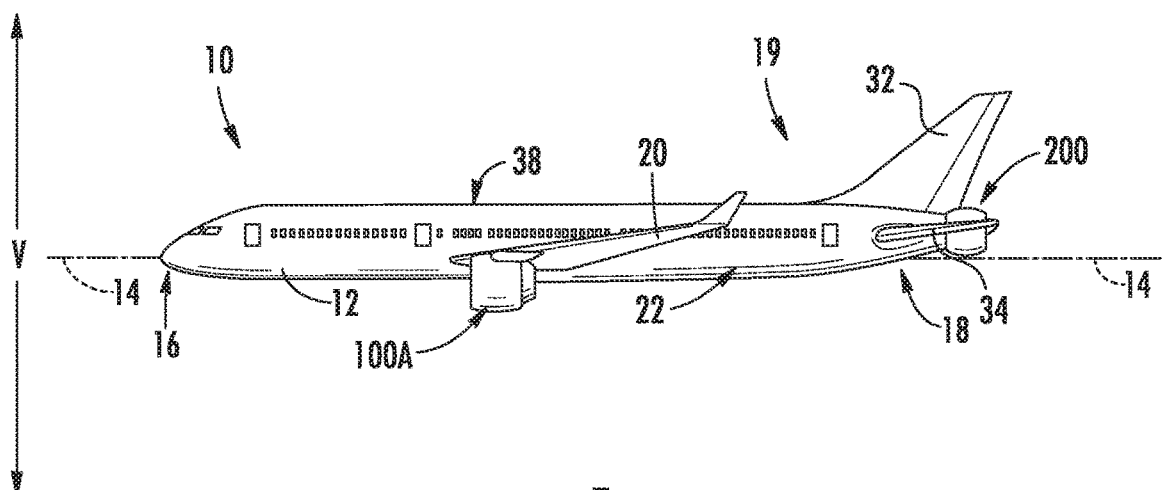
FIG. 5 is a port side view of the exemplary aircraft of FIG. 4.

For example, referring now to FIGS. 4 and 5, an aircraft 10 and hybrid-electric propulsion system 50 in accordance with still another exemplary embodiment of the present disclosure is depicted. The exemplary aircraft 10 and hybrid-electric propulsion system 50 of FIGS. 4 and 5 may be configured in substantially the same manner as exemplary aircraft 10 and hybrid-electric propulsion system 50 of FIGS. 1 through 3, and accordingly, the same or similar numbers may refer to same or similar parts.

For example, the exemplary aircraft 10 of FIGS. 4 and 5 generally includes a fuselage 12, an empennage 19, an electric energy storage unit 55, a first wing 20, and a second wing 22. Additionally, the hybrid-electric propulsion system 50 includes a first propulsor assembly 52 and one or more electric generators (i.e., generators 56A, 56B, discussed below) mechanically driven by the first propulsor assembly 52. Moreover, the hybrid-electric propulsion system 50 includes a second propulsor assembly 54, which is an electric propulsor assembly 200. The first propulsor assembly 52 and generators 56A, 56B are electrically connected to, and configured to provide electrical power to, the second propulsor assembly 54 and/or the electric energy storage and 55 via an electric power bus 58.

However, for the embodiment of FIGS. 4 and 5, the first propulsor assembly 52 includes a first aircraft engine and a second aircraft engine, configured as a first turbofan engine 100A and a second turbofan engine 100B, respectively. For example, turbofan engines 100A, 100B may be configured as turbofan engines (see, e.g., FIG. 2), or any other suitable type of turbomachine, attached to and suspended beneath the wings 20, 22 in an under-wing configuration. Additionally, for the embodiment of FIGS. 4 and 5, the hybrid-electric propulsion system 50 further includes one or more electric generators operable with each of the turbofan engines 100A, 100B. More specifically, for the embodiment depicted, the hybrid-electric propulsion system 50 further includes a first electric generator 56A operable with the first turbofan 100A and a second electric generator 56B operable with the second turbofan 100B. Although depicted schematically outside the respective turbofan engines 100A, 100B, in certain embodiments, the electric generators 56A, 56B may be positioned within a respective turbo engine 100A, 100B (see, e.g., FIG. 2).

Further, for the embodiment of FIGS. 4 and 5, the electric propulsion assembly includes an electric propulsor assembly 200 configured to be mounted at the aft end 18 of the aircraft 10 to at least one of the empennage 19 of the aircraft 10 or the fuselage 12 of the aircraft, and hence the electric propulsor assembly 200 depicted may be referred to as an "aft engine." More specifically, the exemplary electric propulsor assembly 200 depicted is mounted to the fuselage 12 of the aircraft 10 at the aft end 18 of the aircraft 10 and configured to ingest and consume air forming a boundary layer over the fuselage 12 of the aircraft 10. Accordingly, the exemplary electric propulsor assembly 200 depicted in FIGS. 4 and 5 may also be referred to as a boundary layer ingestion (BLI) fan. The electric propulsor assembly 200 is mounted to the aircraft 10 at a location aft of the wings 20, 22 and/or the turbofan engines 100A, 100B. Specifically, for the embodiment depicted, the electric propulsor assembly 200 is fixedly connected to the fuselage 12 at the aft end 18, such that the electric propulsor assembly 200 is incorporated into or blended with a tail section at the aft end 18.

Further, for the embodiment of FIGS. 4 and 5 the hybrid electric propulsion assembly further includes a controller 72. As will be appreciated, the electric energy storage unit 55 may be configured, in certain operating conditions, to receive electrical power from one or both of the first electric generator 56A and the second electric generator 56B. Further, in certain operating conditions, the electric energy storage unit 55 may be configured to provide stored electrical power to the electric propulsor assembly 200. Moreover, the controller 72 is operably connected to turbofan engines 100A, 100B, electric generators 56A, 56B, electric propulsor assembly 200, and electric energy storage unit 55, such that the controller 72 may direct electrical power between the various components.

Notably, although electric generators 56A, 56B are described herein as "electric generators," it will be appreciated that in certain exemplary embodiments, one or both of the generators 56A, 56B may additionally function as electric motors, such that when electric power is provided thereto, the electric "generator" may add power to a shaft (or propulsor) to which it is coupled.

It should be appreciated, however, that in still other exemplary embodiments of the present disclosure, any other suitable aircraft 10 may be provided having a hybrid-electric propulsion system 50 configured in any other suitable manner. For example, in other embodiments, the electric propulsor assembly 200 may be incorporated into the fuselage of the aircraft 10, and thus configured as a "podded engine," or pod-installation engine. Further, in still other embodiments, the electric propulsor assembly 200 may be incorporated into a wing of the aircraft 10, and thus may be configured as a "blended wing engine." Moreover, as stated, that the aircraft 10 may be any suitable aircraft, such as any other suitable fixed-wing aircraft, a vertical takeoff and landing aircraft, a helicopter, etc.

Further, still, it should be appreciated that in certain exemplary embodiments, the hybrid electric propulsion system may not include a pure electric propulsor assembly (i.e., a propulsor assembly without a combustion element). For example, in certain exemplary embodiments the hybrid electric propulsion system may generally include a first turbomachine coupled to a first propulsor (a first propulsor assembly 52), a second turbomachine coupled to a second propulsor (a second propulsor assembly 54), and an electrical system. The electrical system may include a first electric machine integrated into the first propulsor assembly 52, a second electric machine integrated into the second propulsor assembly 54, and an electric energy storage unit electrically connectable to both the first electric machine in the second electric machine. For example, the first electric machine may be coupled to one or both of the first turbomachine and first propulsor, and the second electric machine may be coupled to one or both of the second turbomachine and second propulsor. Electrical power may be drawn from one or both of the first electric machine and second electric machine during certain operations, and further may be provided to one or both of the first electric machine and the second electric machine during other operations. Notably, in certain exemplary embodiments, the first turbomachine and first propulsor may be together configured as a first turbofan engine and the second turbomachine and second propulsor may together be configured as a second turbofan engine. Alternatively, however, these components may be configured as turboprop engines, or any other suitable propulsor assembly.

Figure 6:
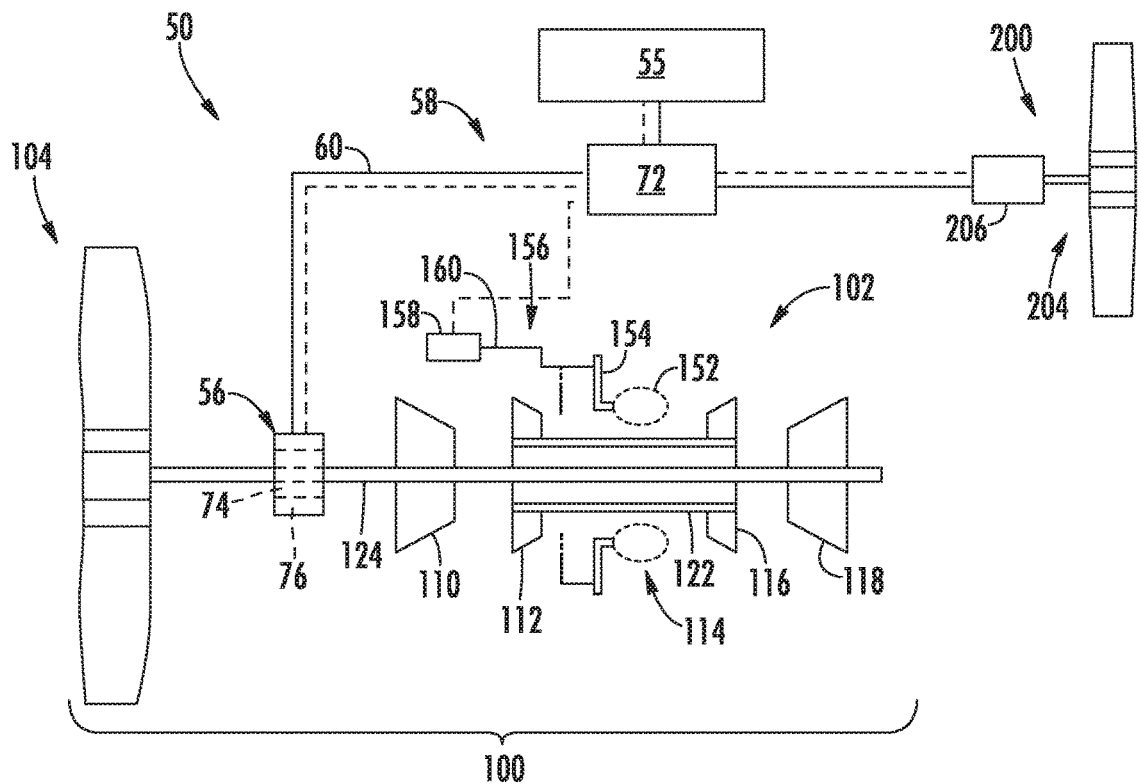
FIG. 6 is a schematic view of a hybrid-electric propulsion system in accordance with an exemplary embodiment of the present disclosure.

Referring now to FIG. 6, providing a schematic diagram of a hybrid-electric propulsion system 50 in accordance with an exemplary embodiment of the present disclosure, certain aspects of the present disclosure will be described. More specifically, FIG. 6 provides a schematic diagram of the exemplary hybrid electric propulsion system 50 described above with reference to FIGS. 1 through 3. Accordingly, the exemplary hybrid-electric propulsion system 50 of FIG. 6 generally includes a turbomachine 102, a prime propulsor 104, an electric motor/generator 56, an electric energy storage unit 55, a controller 72, a power bus 58, and an electric propulsor assembly 200, the electric propulsor assembly 200 generally including an electric motor 206 drivingly connected to a propulsor or fan 204. The turbomachine 102 is mechanically coupled to the prime propulsor 104 for driving the prime propulsor 104 and generating thrust (the turbomachine 102 and prime propulsor 104 together configured as a turbofan engine 100 for the embodiment depicted).

Additionally, the turbomachine 102 is mechanically coupled to the electric motor/generator 56 to generate electrical power. The power bus 58 generally electrically connects the electric motor/generator 56, the electric energy storage unit 55, and the electric motor 206 of the electric propulsor assembly 200. More specifically, for the exemplary embodiment depicted, the power bus 58 selectively electrically connects the electric motor/generator 56, the electric energy storage unit 55, and the electric motor 206 in response to commands by the controller 72. Notably, although for the embodiment depicted electric lines 60 of the power bus 58 extend physically through the controller 72, it should be appreciated that in other exemplary embodiments, the controller 72 may instead be operably connected to, e.g., one or more switches or other hardware for directing electrical power between the electric generator 56, the electric energy storage unit 55, and the electric motor 206. Further, it should be appreciated that although not depicted, the hybrid electric propulsion system 50 may further include one or more rectifiers, inverters, converters, or other power electronics for conditioning or converting the electrical power within and throughout the hybrid electric propulsion system 50.

Further, as is depicted schematically, the turbomachine 102 generally includes a first, low pressure spool 124 and a second, high pressure spool 122. Additionally, the exemplary turbomachine 102 generally includes a low pressure (LP) compressor 110 and a low pressure (LP) turbine 118, each coupled to the first spool 124, as well as a high pressure (HP) compressor 112 and a high pressure (HP) turbine 116, each coupled to the second spool 122. Moreover, for the embodiment depicted, the first spool 124 is further mechanically coupled to the prime propulsor 104, or fan, such that the first spool 124 rotates the prime propulsor 104 during operation of the turbomachine 102.

Further, the electric motor/generator 56 is mechanically coupled to the first spool 124 of the turbomachine 102, the second spool 122 of the turbomachine 102, or both. More particularly, for the embodiment depicted, the electric motor/generator 56 is mechanically coupled to the first spool 124 of the turbomachine 102. For example, the exemplary electric motor/generator 56 generally includes a rotor 74 and a stator 76, with the rotor 74 mechanically coupled to, and rotatable with, the first spool 124.

The turbomachine 102 additionally includes a combustion section 114, with the combustion section 114 including at least one combustor 152 and a plurality of fuel nozzles 154. The fuel nozzles 154 are configured to receive fuel from a fuel delivery system 156, the fuel delivery system 156 including a fuel pump 158 and a plurality of fuel lines 160 fluidly connecting the fuel pump 158 to the respective fuel nozzles 154. Although not depicted, the fuel pump 158 may be fluidly connected to a fuel tank or other fuel source. For the embodiment depicted, the fuel pump 158 is operably connected to the controller 72, such that the controller 72 may increase or decrease an amount of fuel provided to the plurality of fuel nozzles 154 during operation of the hybrid electric propulsion system 50. The fuel nozzles 154 are configured to provide a flow of fuel to the combustors 152, where it is mixed with compressed air from the compressors and burned to generate combustion gases, the combustion gases flowing through the turbines to drive the turbines. Accordingly, it will be appreciated that an amount of fuel provided to the combustion section 114 may affect a rotational speed of the first spool 124 and second spool 122.

During certain flight phases of the aircraft, it may be desirable to increase an amount of thrust generated by the hybrid electric propulsion system 50, and in particular, an amount of thrust generated by the turbofan engine 100 (i.e., by the turbomachine 102 and prime propulsor 104). However, in other flight phases of the aircraft, it may be desirable to decrease an amount of thrust generated by the hybrid electric propulsion system 50, and in particular, an amount of thrust generated by the turbofan engine 100 (i.e., turbomachine 102 and prime propulsor 104). For example, at the end of a cruise flight phase, the aircraft may transition into a descent flight phase. At such transition, an amount of thrust required by the aircraft is reduced as the aircraft is descending in altitude, reducing its speed, or both. In order to affect such a reduction in trust, the controller 72 may reduce a fuel flow to the combustion section 114. Such a reduction in fuel flow to the combustion section 114 may reduce an amount of energy within the combustion gases provided to the turbines such that a rotational speed of the first spool 124 and a rotational speed of second spool 122 are reduced.

As will be appreciated, and as is depicted in FIG. 6, the first spool 124 is mechanically coupled to larger components having a much greater inertia than the components to which the second spool 122 is mechanically coupled. Accordingly, the first spool 124 may slow down at a slower rate than the second spool 122 when the flow fuel to the combustion section 114 is reduced. Such may create an undesirable mismatch in a speed relationship parameter defined between the first spool 124 and the second spool 122, potentially causing a compressor stall in the LP compressor 110 (caused by too high of a pressure differential across the LP compressor 110 when the HP compressor 112 doesn't accept all the air from the LP compressor 110).

However, the present disclosure provides a system for bringing and/or maintaining the speed relationship parameter within a desired range, reducing the potential for stall in the LP compressor 110 in the above identified situation. More specifically, the present disclosure includes the electric motor/generator 56 mechanically coupled to the first spool 124 and configured to slow down the first spool 124 to reduce the speed relationship parameter during at least certain operations. For example, in response to a reduction in fuel flow to the combustion section 114 and/or determining a speed relationship parameter outside a desired range, the controller 72 may be configured to draw electrical power from the electric motor/generator 56, such that the electric motor/generator 56 acts as a drag on the LP system and first spool 124, slowing down rotation of the first spool 124 to reduce the speed relationship parameter defined between the first spool 124 and the second spool 122.

Figure 7:
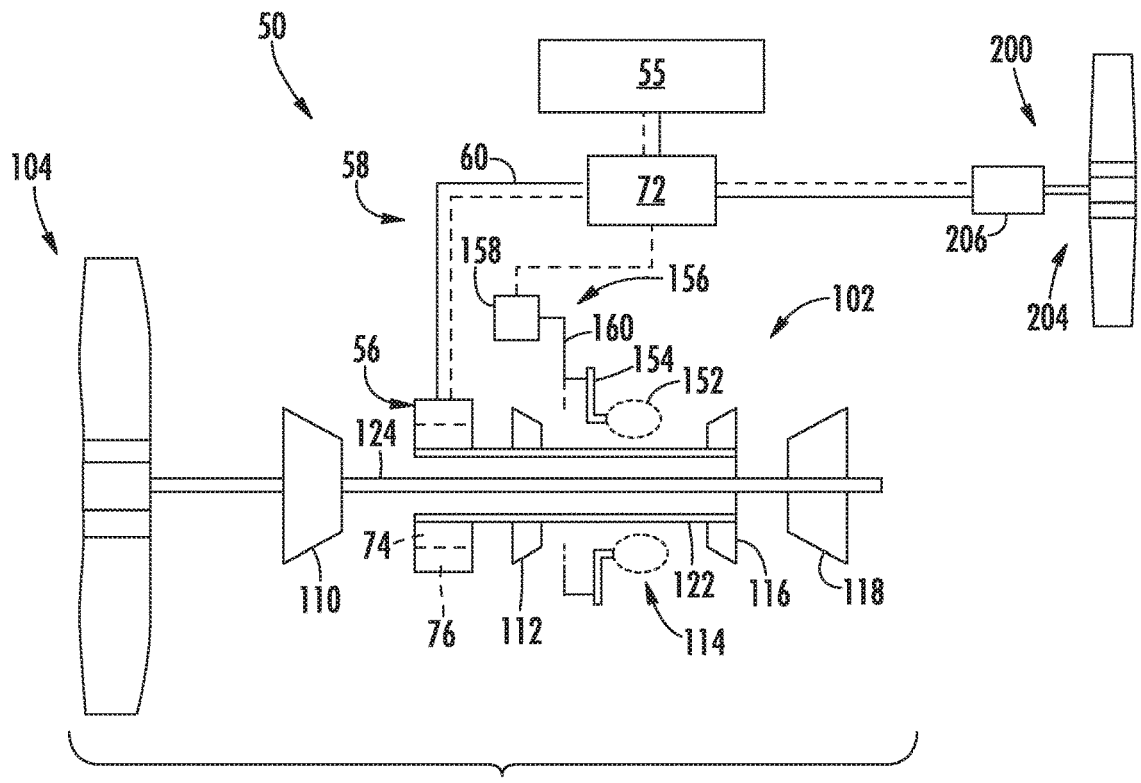
FIG. 7 is a schematic view of a hybrid-electric propulsion system in accordance with another exemplary embodiment of the present disclosure.

It should be appreciated, however, that in other exemplary embodiments, the hybrid electric propulsion system 50 may have any other suitable configuration. For example, referring now to FIG. 7, a hybrid electric propulsion system 50 in accordance with another exemplary embodiment of the present disclosure is provided. The exemplary hybrid electric propulsion system 50 of FIG. 7 is configured in substantially the same manner as the exemplary hybrid electric propulsion system 50 of FIG. 6. Accordingly, the same numbers refer to the same parts.

However, for the exemplary embodiment of FIG. 7, the electric motor/generator 56 is instead mechanically coupled to the second spool 122 of the turbomachine 102. More particularly, a rotor 74 of the electric motor/generator 56 is mechanically coupled to and rotatable with the second spool 122 of the turbomachine 102. With such a configuration, the hybrid electric propulsion system 50 may also be configured to bring or maintain a speed relationship parameter defined between the first spool 124 and the second spool 122 within a desired speed relationship parameter range in response to a fuel flow to the combustion section 114 of the turbomachine 102 being reduced and/or determining a speed relationship parameter outside a desired speed relationship parameter range. For example, in at least certain exemplary aspects, the controller 72 of the hybrid electric propulsion system 50 may be configured to reduce the speed relationship parameter between the first spool 124 and the second spool 122 by providing electrical power to the electric motor/generator 56 to drive the second spool 122, applying torque to the second spool 122, such that the second spool 122 slows down at a similar speed as the first spool 124.

It should further be appreciated, however, that in still other exemplary embodiments, the hybrid electric propulsion system 50 may have any other suitable configuration.

Notably, including a hybrid electric propulsion system 50 in accordance with one or more of the above embodiments may allow for maintaining a speed relationship parameter between the first and second spools 124, 122 of the turbomachine 102 within a desired speed relationship parameter range to prevent, or reduce a likelihood of, compressor stall in, e.g., an LP compressor 110. For example, when a speed of the LP compressor increases relative to a speed of the HP compressor (e.g., during a turn-down the HP compressor) the HP compressor may not be able to accept all of a flow through the LP compressor. Traditionally, such a situation is remedied by bleeding air through one or more variable bleed valves downstream of an outlet of the LP compressor. However, such may require relatively heavy variable bleed valve door assemblies and further may reduce an efficiency of the turbomachine. However, with at least certain exemplary embodiments of the present disclosure, the hybrid electric propulsion system 50 may allow for maintenance of the speed relationship parameter within the desired speed relationship parameter range, potentially eliminating a need to bleed off air from the LP compressor 110. Accordingly, such a configuration may allow for the elimination of bleed valve door assemblies, or variable bleed valve door assemblies, in a duct 111 extending between, e.g., the LP compressor 110 and HP compressor 112 (see FIG. 2). Accordingly, with one or more of the above exemplary embodiments, the duct 111 extending from the LP compressor 110 to the HP compressor 112 may be fixed in position during all operating conditions of the turbomachine 102. More specifically, with one or more of the above exemplary embodiments, the duct 111 extending from the LP compressor 110 to the HP compressor does not define any bleed valve door openings for one or more variable bleed valve doors. Such a configuration is depicted in FIG. 2.

It should be appreciated, however, that although the exemplary hybrid electric propulsion systems 50 described above are described as being able to maintain a speed relationship parameter between a first spool and a second spool of the turbomachine 102 within a desired speed relationship parameter range during transient operations of the turbomachine 102, the systems 50 may further be capable of maintaining the speed relationship parameter within the desired speed relationship parameter range during steady-state operations. More specifically, it will be appreciated that in order to increase an efficiency, or other operability parameters, of the turbomachine 102, it is sometimes desirable for a speed of the first spool of the turbomachine 102 to be different than a speed that would naturally occur relative to a speed of the second spool of the turbomachine 102. For example, in certain exemplary embodiments, it may be beneficial for the first spool to rotate between about two percent and about six percent slower than the second spool during certain steady-state operations, such as cruise, and/or during transient conditions. Alternatively, in other exemplary embodiments, it may be beneficial for the first spool to rotate faster than the second spool during certain steady-state operations or transient conditions.

It will further be appreciated, that in at least certain exemplary aspects of the exemplary hybrid electric propulsion systems 50 described above, the systems 50 may be capable of bringing or maintaining such a speed relationship parameter within a desired speed relationship parameter range during operation by drawing electrical power from, or providing electrical power to, an electric machine coupled to the first spool, the second spool, or both. Moreover, it will be appreciated, that as used herein, the term "speed relationship parameter" with reference to a first spool and a second spool, refers to any speed-derivative parameter relating a rotational speed of the first spool relative to a rotational speed the second spool. For example, in certain exemplary embodiments, the speed relationship parameter may be a rotational speed differential between the first spool and the second spool. Additionally, or alternatively, in certain exemplary embodiments, the speed relationship parameter may be a rotational acceleration differential between the first spool and the second spool.

Figure 8:
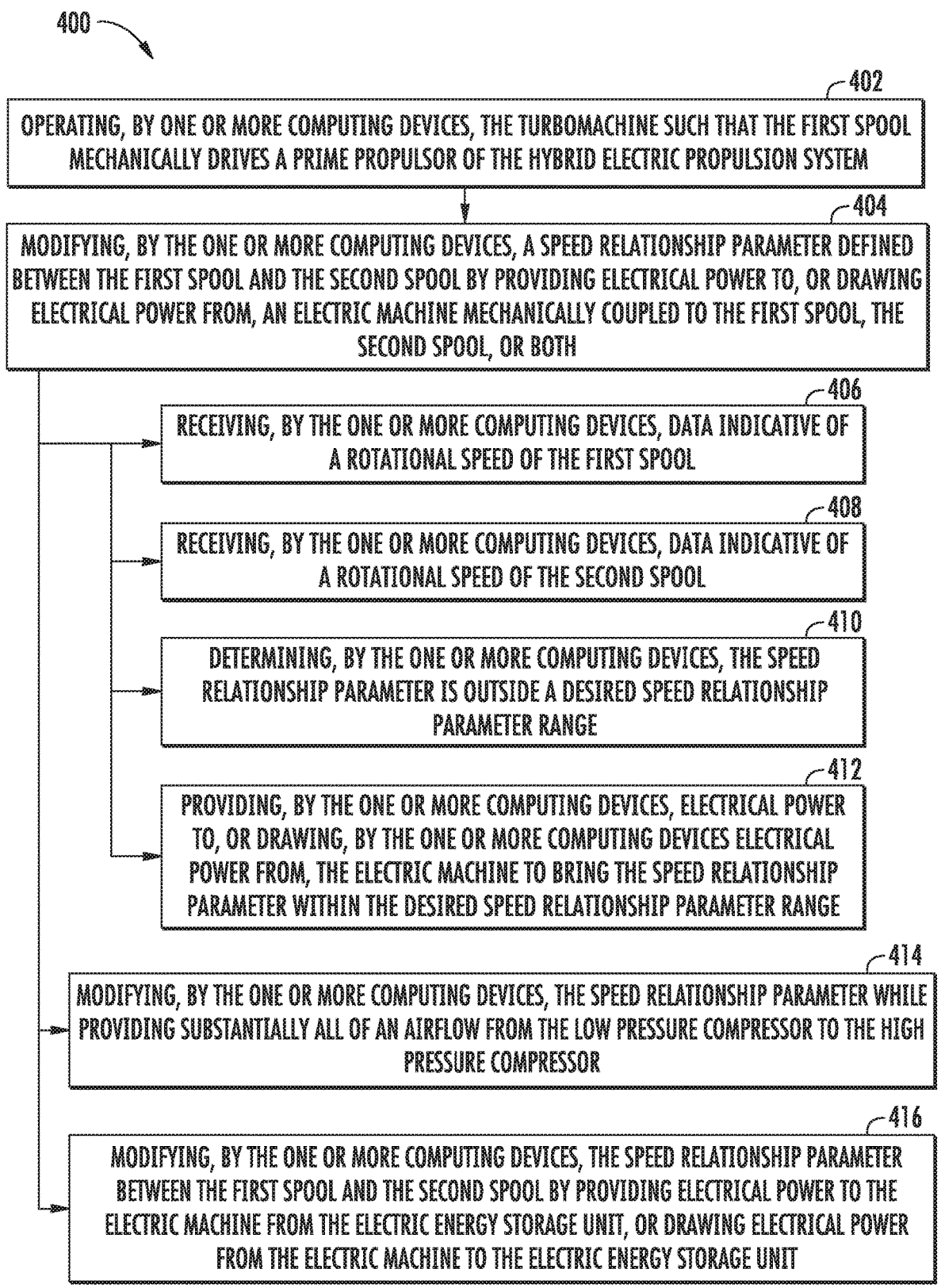
FIG. 8 is a flow diagram of a method for operating a hybrid-electric propulsion system for an aircraft in accordance with an exemplary aspect of the present disclosure.

Referring now to FIG. 8, a method 400 of operating a hybrid electric propulsion system for an aircraft is provided. The exemplary method 400 may be utilized with one or more of the exemplary hybrid electric propulsion systems described above. Accordingly, the method 400 of FIG. 8 may be utilized with a hybrid electric propulsion system having a turbomachine, a prime propulsor, an electric machine, an electric energy storage unit, a controller, and optionally an electric propulsor assembly. The turbomachine of the hybrid electric propulsion system includes at least a first spool and a second spool, and the method 400 may bring or maintain a speed relationship parameter defined by the first spool and second spool of the turbomachine within a desired speed relationship parameter range. The first spool may be a low pressure spool, and the second spool may be a high pressure spool The method 400 generally includes at (402) operating, by one or more computing devices, the turbomachine such that the first spool mechanically drives the prime propulsor of the hybrid electric propulsion system. Notably, in certain exemplary embodiments, the turbomachine and the prime propulsor may together be configured as a turbofan engine. However, in other exemplary aspects, the turbomachine and prime propulsor may instead be configured as any other suitable engine, such as a turboprop engine.

The method 400 further includes at (404) modifying, by the one or more computing devices, a speed relationship parameter defined between the first spool and the second spool by providing electrical power to, or drawing electrical power from an electric machine mechanically coupled to the first spool, the second spool, or both. Notably, in certain exemplary aspects, modifying, by the one or more computing devices, the speed relationship parameter at (404) may occur during operation of the hybrid electric propulsion system during a steady-state condition (e.g., during a cruise operating mode), or alternatively, may occur during operation of the hybrid electric propulsion system during a transient operating condition (e.g., transitioning from a cruise operating mode to a descent operating mode; discussed in greater detail below with reference to FIG. 9).

More specifically, for the exemplary aspect depicted in FIG. 8, modifying, by the one or more computing devices, the speed relationship parameter defined between the first spool and the second spool at (404) includes at (406) receiving, by the one or more computing devices, data indicative of a rotational speed of the first spool, and at (408) receiving, by the one or more computing devices, data indicative of a rotational speed of the second spool. Further, for the exemplary aspect depicted, modifying, by the one or more computing devices, the speed relationship parameter at (404) further includes at (410) determining, by the one or more computing devices, the speed relationship parameter is outside a desired speed relationship parameter range, and at (412) providing, by the one or more computing devices, electrical power to, or drawing, by the one or more computing devices, electrical power from, the electric machine to bring the speed relationship parameter within the desired speed relationship parameter range. Drawing the electric power from the electric machine may create a drag on the spool to which is attached, increasing a deceleration and decreasing a speed of such spool. By contrast, providing the electric power to the electric machine may add power to the spool to which is attached, increasing an acceleration and speed of such spool.

It should be appreciated, however, that in other exemplary aspects, the method 400 may not affirmatively determine the speed relationship parameter is outside the desired speed relationship parameter range. For example, in other exemplary aspects, the method 400 may instead receive various inputs, such as throttle inputs, acceleration and/or deceleration rates of relevant spools, etc., and take corrective action, below, in response to these inputs received.

Additionally, as briefly discussed previously, operating a hybrid electric propulsion system in accordance with such an exemplary aspect may allow for maintaining a desired speed relationship parameter without use of variable bleed valve doors. For example, in certain exemplary aspects, the first spool may be a low pressure spool extending between a low pressure compressor and a low pressure turbine, and the second spool may be a high pressure spool extending between a high pressure compressor and a high pressure turbine. With such an exemplary aspect, modifying, by the one or more computing devices, the speed relationship parameter defined between the first spool and the second spool at (404) includes at (414) modifying, by the one or more computing devices, the speed relationship parameter while providing substantially all of an airflow from the low pressure compressor to the high pressure compressor.

Moreover, as stated, for the exemplary aspect of FIG. 8, the hybrid electric propulsion system includes the electric energy storage unit electrically connectable to the electric machine and to the electric propulsor assembly (if included). Accordingly, with such an exemplary aspect, modifying, by the one or more computing devices, the speed relationship parameter at (404) includes at (416) modifying, by the one or more computing devices, the speed relationship parameter between the first spool and the second spool by providing electrical power to the electric machine from the electric energy storage unit, or drawing electrical power from the electric machine to the electric energy storage unit. Additionally, in certain exemplary aspects, drawing, by the one or more computing devices, electrical power from the electric machine to the electric energy storage unit, may further include charging the electric energy storage unit. It will be appreciated, however, that in other exemplary embodiments, the electric energy storage unit may be at a maximum charge level, or otherwise may not be in a condition to accept additional electrical power. Accordingly in certain exemplary aspects, drawing electrical power from the electric machine may further include drawing electrical power from the electric machine to a load bank configured to convert the electrical power to heat.

Figure 9:
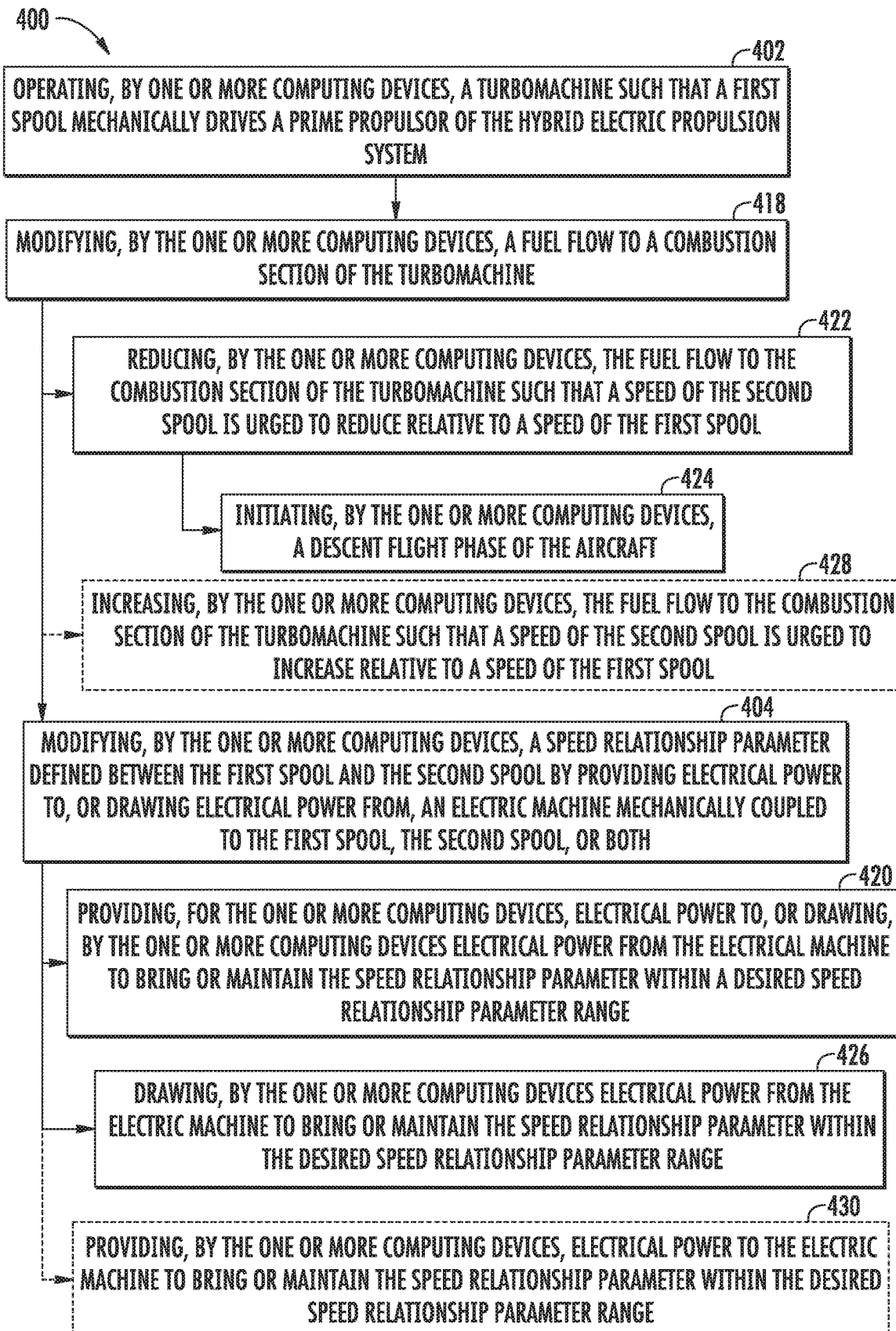
FIG. 9 is a flow diagram of a method for operating a hybrid-electric propulsion system for an aircraft in accordance with another exemplary aspect of the present disclosure.

Moreover, referring now to FIG. 9, another exemplary embodiment of the method 400 described above is provided. More specifically, the exemplary aspect of the method 400 depicted in FIG. 9 is a particular aspect of the method 400 applied to transient operating conditions of the aircraft with which the hybrid electric propulsion system is installed. Accordingly, the exemplary method 400 of FIG. 9 may be similar to the exemplary method 400 described above with reference to FIG. 8.

For example, the exemplary method 400 of FIG. 9 generally includes at (402) operating, by one or more computing devices, a turbomachine such that a first spool mechanically drives a prime propulsor of the hybrid electric propulsion system, and at (404) modifying, by the one or more computing devices, a speed relationship parameter defined between the first spool and the second spool by providing electrical power to, or drawing electrical power from, an electric machine mechanically coupled to the first spool, the second spool, or both.

Notably, however, the exemplary aspect of the method 400 depicted in FIG. 9 is applied to transient operating conditions. Accordingly, the exemplary aspect of the method 400 depicted in FIG. 9 further includes at (418) modifying, by the one or more computing devices, a fuel flow to a combustion section of the turbomachine. Additionally, with such an exemplary aspect, modifying, by the one or more computing devices, the speed relationship parameter defined between the first spool and the second spool at (404) further includes at (420) providing, for the one or more computing devices, electrical power to, or drawing, by the one or more computing devices electrical power from the electric machine to bring or maintain the speed relationship parameter within a desired speed relationship parameter range.

For example, in one exemplary aspect, as is depicted, modifying, by the one or more computing devices, the fuel flow to the combustion section of the turbomachine at (418) includes at (422) reducing, by the one or more computing devices, the fuel flow to the combustion section of the turbomachine such that a speed of the second spool is urged to reduce relative to a speed of the first spool. More specifically, for the exemplary aspect depicted, the first spool is a low pressure spool, the second spool is a high pressure spool, and the electric machine is coupled to the first spool. Accordingly, as is explained above, reducing the fuel flow to the combustion section of the turbomachine urges the speed of the second spool to reduce relative to the speed of the first spool due to a greater inertia of the components coupled to the first spool as compared to the components coupled to the second spool.

Referring still to FIG. 9, with such an exemplary aspect, modifying, by the one or more computing devices, the speed relationship parameter defined between the first spool and the second spool at (404) further includes at (426) drawing, by the one or more computing devices, electrical power from the electric machine to bring or maintain the speed relationship parameter within the desired speed relationship parameter range. For example, as is discussed above, in certain exemplary aspects, the method may draw electrical power to an electric energy storage unit or, e.g., a load bank configured to convert the electrical power to heat. In such a manner, the electric machine may act as a drag on the first spool to assist with decelerating first spool such that the speed relationship parameter is brought within, or maintained within, the desired speed relationship parameter range. For example, drawing power from the electric machine at (426) may include drawing power in response to determining the speed relationship parameter is outside the desired range (see, e.g., (406) through (412)), or alternatively may include drawing power automatically in response to, and in concert with, reducing the fuel flow at (422), such that the speed relationship parameter is maintained within the desired range.

Briefly, as is depicted, reducing, by the one or more computing devices, the fuel flow to the combustion section of the turbomachine at (422) includes for the embodiment of FIG. 9 at (424) initiating, by the one or more computing devices, a descent flight phase of the aircraft. However, in other exemplary aspects, reducing, by the one or more computing devices, the fuel flow to the combustion section of the turbomachine at (422) may instead include initiating any other flight phase involving a reduction in power demand from the gas turbine engine.

It should be appreciated, however, that in other exemplary aspects, the method 400 may be applied to other transient conditions. For example, as is depicted in phantom, in other exemplary aspects, modifying, by the one or more computing devices, the fuel flow to the combustion section of the turbomachine at (418) may include at (428) increasing, by the one or more computing devices, the fuel flow to the combustion section of the turbomachine such that a speed of the second spool is urged to increase relative to a speed of the first spool. As with the exemplary aspect previously discussed, the first spool may be a low pressure spool and the second spool may be a high pressure spool. With such an exemplary aspect, as is also depicted in phantom, modifying, by the one or more computing devices, the speed relationship parameter defined between the first spool and the second spool at (404) may further include at (430) providing, by the one or more computing devices, electrical power to the electric machine to bring or maintain the speed relationship parameter within the desired speed relationship parameter range. For example, in certain exemplary aspects, the method 400 may provide electrical power from the electric energy storage unit to the electric machine to drive the electric machine. With such an exemplary aspect, the electric machine may add power to the first spool, such that the first spool accelerates more quickly and speed relationship parameter is brought within, or maintained within the desired speed relationship parameter range. For example, adding power to the electric machine at (430) may include adding power in response to determining the speed relationship parameter is outside the desired range (see, e.g., (406) through (412)), or alternatively may include adding power automatically in response to, and in concert with, increasing the fuel flow at (428), such that the speed relationship parameter is maintained within the desired range.

It should be appreciated, that in still other exemplary aspects, the method 400 may utilize the electric machine to bring or maintain the speed relationship parameter within a desired speed relationship parameter range in any other suitable manner. For example, in other exemplary embodiments, the electric machine may instead be mechanically coupled to the second spool, and modifying, by the one or more computing devices, the speed relationship parameter defined between the first spool and the second spool at (404) may include modifying, by the one or more computing devices, the speed relationship parameter defined between the first spool and the second spool by providing electrical power to, or drawing electrical power from, the electric machine mechanically coupled to the second spool. For example, with such an exemplary aspect, when the method 400 includes reducing, by the one or more computing devices, the fuel flow to the combustion section of the turbomachine at (422), modifying, by the one or more computing devices, the speed relationship parameter at (404) may include providing power to the electric machine. Similarly, with such an exemplary aspect, when the method 400 includes increasing, by the one or more computing devices, the fuel flow to the combustion section of the turbomachine at (428), modifying, by the one or more computing devices, the speed relationship parameter at (404) may include drawing power from the electric machine.

Operating a hybrid electric propulsion system in accordance with the exemplary aspects of FIGS. 8 and/or 9 may allow for a speed relationship parameter defined by multiple shafts of a turbomachine to be brought within, or maintained within, a desired speed relationship parameter range without requiring, e.g., one or more variable bleed valve doors in a duct between compressors of the turbomachine to bleed off airflow. Such a configuration may save weight, complexity, and cost for the hybrid electric propulsion system. Further, operating a hybrid electric propulsion system in accordance with the exemplary aspects of FIGS. 8 and/or 9 may allow for a speed relationship parameter defined by multiple shafts of the turbomachine to be brought within, or maintained within, a desired speed relationship parameter range during steady-state and transient operating conditions, which may increase an efficiency of the turbomachine and/or provide other operational benefits.

Figure 10:
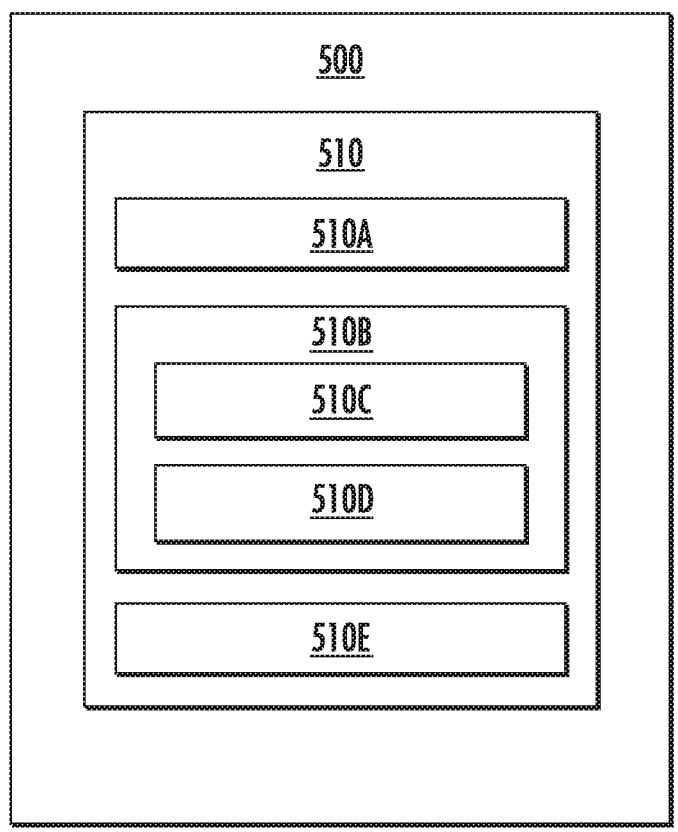
FIG. 10 is a computing system according to example aspects of the present disclosure.

Referring now to FIG. 10, an example computing system 500 according to example embodiments of the present disclosure is depicted. The computing system 500 can be used, for example, as a controller 72 in a hybrid electric propulsion system 50. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for reducing a speed parameter mismatch between spools of a turbomachine (e.g., method 400), as described herein, and/or any other operations or functions of the one or more computing device(s) 510. The instructions 510C can be software written in any suitable programming language or can be implemented in hardware. Additionally, and/or alternatively, the instructions 510C can be executed in logically and/or virtually separate threads on processor(s) 510A. Accordingly, in certain exemplary aspects, the method 300 may be a computed-implemented method, such that one or more of the steps described above may be done using one or more computing devices, such as the computing system 500.

The memory device(s) 510B can further store data 510D that can be accessed by the processor(s) 510A. For example, the data 510D can include data indicative of rotational speeds of spools of a turbomachine, any user input, and/or any other data and/or information described herein.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a hybrid-electric propulsion system for an aircraft having a turbomachine, the turbomachine including a first spool and a second spool, the method comprising:

operating, by one or more computing devices, the turbomachine such that the first spool mechanically drives a prime propulsor of the hybrid-electric propulsion system, the turbomachine comprising a low pressure compressor and a high pressure compressor in a serial flow relationship from the low pressure compressor to the high pressure compressor; and modifying, by the one or more computing devices, a speed relationship parameter defined between the first spool and the second spool by providing electrical power to the second spool via an electric machine when the first spool reduces speed at a first rate and the second spool reduces speed at a second rate that is faster than the first rate during a thrust reduction operation, wherein the first spool is a low pressure spool, wherein the second spool is a high pressure spool, and wherein the electric machine is coaxially coupled to the first spool forward of the low pressure compressor of the turbomachine.

2. The method of claim 1, wherein modifying, by the one or more computing devices, the speed relationship parameter defined between the first spool and the second spool comprises:

receiving, by the one or more computing devices, data indicative of a rotational speed of the first spool;

receiving, by the one or more computing devices, data indicative of a rotational speed of the second spool; and determining, by the one or more computing devices, the speed relationship parameter is outside a desired speed relationship parameter range.

3. The method of claim 1, further comprising:

modifying, by the one or more computing devices, a fuel flow to a combustion section of the turbomachine;

wherein modifying, by the one or more computing devices, the speed relationship parameter defined between the first spool and the second spool comprises providing, by the one or more computing devices, electrical power to, or drawing, by the one or more computing devices, electrical power from, the electric machine to bring or maintain the speed relationship parameter within a desired speed relationship parameter range.

4. The method of claim 3, wherein modifying, by the one or more computing devices, the fuel flow to the combustion section of the turbomachine comprises reducing, by the one or more computing devices, the fuel flow to the combustion section of the turbomachine such that a speed of the second spool is urged to reduce relative to a speed of the first spool.

5. The method of claim 4, wherein modifying, by the one or more computing devices, the speed relationship parameter defined between the first spool and the second spool comprises drawing, by the one or more computing devices, electrical power from the electric machine to bring or maintain the speed relationship parameter within the desired speed relationship parameter range.

6. The method of claim 5, wherein reducing, by the one or more computing devices, the fuel flow to the combustion section of the turbomachine comprises initiating, by the one or more computing devices, a flight phase of the aircraft involving a reduction in power demand from the turbomachine.

7. The method of claim 3, wherein modifying, by the one or more computing devices, the fuel flow to the combustion section of the turbomachine comprises increasing, by the one or more computing devices, the fuel flow to the combustion section of the turbomachine such that a speed of the second spool is urged to increase relative to a speed of the first spool.

8. The method of claim 7, wherein modifying, by the one or more computing devices, the speed relationship parameter defined between the first spool and the second spool comprises providing, by the one or more computing devices, electrical power to the electric machine to bring or maintain the speed relationship parameter within the desired speed relationship parameter range.

9. The method of claim 3, wherein modifying, by the one or more computing devices, the speed relationship parameter defined between the first spool and the second spool comprises wherein modifying, by the one or more computing devices, the speed relationship parameter while providing substantially all of an airflow from the low pressure compressor to the high pressure compressor.

10. The method of claim 1, wherein the speed relationship parameter is an acceleration mismatch between the first spool and the second spool.

11. The method of claim 1, wherein the hybrid electric propulsion system further comprises an electric energy storage unit, wherein the electric energy storage unit is electrically connectable to the electric machine, and wherein modifying, by the one or more computing devices, the speed relationship parameter between the first spool and the second spool comprises modifying, by the one or more computing devices, the speed relationship parameter by providing electrical power to the electric machine from the electric energy storage unit, or drawing electrical power from the electric machine to the electric energy storage unit.

12. The method of claim 11, wherein the electric energy storage unit is configured to store between about fifty kilowatt hours and five hundred kilowatt hours of electrical power.

13. A hybrid-electric propulsion system for an aircraft comprising:
a turbomachine comprising a first spool operably coupled with a low pressure compressor, a second spool operably coupled with a high pressure compressor in a serial flow arrangement and downstream of the low pressure compressor in an axial direction, and a combustion section, wherein the first spool reduces speed at a first rate and the second spool reduces speed at a second rate that is faster than the first rate during a thrust reduction operation;
a prime propulsor mechanically coupled to the first spool such that the first spool rotates the prime propulsor during operation;
an electric machine mechanically coupled to the first spool forward of the low pressure compressor;
an electric energy storage unit electrically connectable to the electric machine; and
a controller comprising memory and one or more processors, the memory storing instructions that when executed by the one or more processors cause the hybrid-electric propulsion system to perform functions, the functions including:
modifying a speed relationship parameter between the first spool and the second spool by providing electrical power to the electric machine mechanically coupled to the second spool to reduce the second rate of the second spool.

14. The hybrid-electric propulsion system of claim 13, wherein the turbomachine comprises a duct extending from the low pressure compressor to the high pressure compressor, wherein the duct is fixed in position during all operating conditions of the turbomachine.

15. The hybrid-electric propulsion system of claim 13, wherein the turbomachine comprises a duct extending from the low pressure compressor to the high pressure compressor, wherein the duct does not define any bleed valve openings.

16. The hybrid-electric propulsion system of claim 13, wherein the instructions further include:
modifying a fuel flow to the combustion section of the turbomachine;
wherein modifying the speed relationship parameter defined between the first spool and the second spool comprises providing electrical power to, or drawing electrical power from, the electric machine to bring or maintain the speed relationship parameter within a desired speed relationship parameter range.

17. The hybrid-electric propulsion system of claim 13, wherein modifying the speed relationship parameter defined between the first spool and the second spool comprises:
receiving data indicative of a rotational speed of the first spool;
receiving data indicative of a rotational speed of the second spool;
determining the speed relationship parameter is outside a desired speed relationship parameter range; and
providing electrical power to, or drawing electrical power from, the electric machine to bring the speed relationship parameter within the desired speed relationship parameter range.

18. The hybrid-electric propulsion system of claim 13, wherein the first spool is a low pressure spool, wherein the second spool is a high pressure spool, wherein the first spool extends between the low pressure compressor and a low pressure turbine, wherein the second spool extends between the high pressure compressor and a high pressure turbine, and wherein modifying the speed relationship parameter comprises modifying the speed relationship parameter while providing substantially all of an airflow from the low pressure compressor to the high pressure compressor.

19. The hybrid-electric propulsion system of claim 13, wherein the electric energy storage unit is configured to store between about fifty kilowatt hours and five hundred kilowatt hours of electrical power.

\* \* \* \* \*